United States Patent [19]

Horikita et al.

[11] Patent Number: 4,478,766

[45] Date of Patent: Oct. 23, 1984

[54] AIR DIFFUSER FOR WASTE WATER TREATMENT

[75] Inventors: Hiroyuki Horikita, Nagoya; Tetsuo Kataoka, Kuwana, both of Japan

[73] Assignee: NGK Insulators, Ltd., Nagoya, Japan

[21] Appl. No.: 477,401

[22] Filed: Mar. 21, 1983

[30] Foreign Application Priority Data

Aug. 13, 1982 [JP] Japan .............................. 57-123255[U]

[51] Int. Cl.³ ................................................ B01F 3/04
[52] U.S. Cl. .................................. 261/124; 210/221.2
[58] Field of Search .............................. 261/122, 124; 210/221.2; 209/170; 422/231; 435/313; 239/145, 534, 554, 555

[56] References Cited

U.S. PATENT DOCUMENTS

| | | | |
|---|---|---|---|
| 2,271,764 | 2/1942 | Heil | 261/124 X |
| 3,219,427 | 11/1965 | Hymowitz | 261/124 X |
| 3,396,950 | 8/1968 | Wood | 261/124 X |
| 3,642,260 | 2/1972 | Danjes et al. | 261/122 |
| 3,953,554 | 4/1976 | Loughridge | 261/124 |
| 3,970,731 | 7/1976 | Oksman | 261/124 X |
| 3,977,606 | 8/1976 | Wyss | 261/122 X |
| 4,048,266 | 9/1977 | Baumann | 261/124 X |
| 4,201,691 | 5/1980 | Asher et al. | 261/124 X |
| 4,269,797 | 5/1981 | Mikiya et al. | 261/124 X |
| 4,290,982 | 9/1981 | Baumann | 261/124 |

FOREIGN PATENT DOCUMENTS 597951  5/1960  Canada .............................. 261/124

*Primary Examiner*—Richard L. Chiesa
*Attorney, Agent, or Firm*—Parkhurst & Oliff

[57] ABSTRACT

An air diffuser has a non-porous rigid plate mounted on an air chamber to permit diffusion of air to the outside of the chamber, which porous plate has a smooth outer surface and diffusing pores extending therethrough, more than 95% of the diffusing pores having diameters within ±20% of a nominal diameter selected in a range of 50-300 μm.

11 Claims, 4 Drawing Figures

AIR DIFFUSER FOR WASTE WATER TREATMENT

BACKGROUND OF THE INVENTION

1. Field of the Invention

This invention relates to an air diffuser, and more particularly to an improved air diffuser which is suitable for use in an aeration tank for waste water treatment.

2. Description of the Prior Art

A typical air diffuser which is used in an aeration tank for waste water treatment or the like comprises an air chamber having an orifice and an air diffuser plate disposed at the top portion thereof. The air diffuser plate of this type has been formed by bonding such minute particles as silica sand or finely pulverized particles of ceramic materials or synthesized resin fine particles, with any of adhesives suitable for producing the porous structure. Accordingly, in the air diffuser plate of the prior art, the shape of the pores for air diffusion is not uniform and the size of the pores varies depending on the distribution of minute particles and the degree of densifying of the minute particles, so that the diameters of the pores vary considerably and the air-pressure loss at the diffusing pores is not uniform. Besides, the average diameter of the air diffusing pores is fairly large, and the air diffusing pores with a large diameter and a small air-pressure loss will allow passage of a large amount of air and generate a large quantity of coarse air bubbles. On the other hand, the air diffusing pores with a small diameter and a large air-pressure loss allow passage of only a small amount of air or hardly allow passage of air, so that such air diffusing pores produce only a comparatively small quantity of fine air bubbles. Consequently, the air diffuser plate of the prior art has a shortcoming in that its efficiency is very low. Even when fine bubbles are produced from a diffusing pore of which the spacings between adjacent ones are not uniformly located, the fine air bubbles tend to combine with other fine air bubbles from closely adjacent diffusing pores, so as to turn the fine air bubbles into coarse air bubbles.

In recent years, attention has been called to air diffusers having small pores with uniformly fine particles of ceramic material from the standpoint of improving the air diffusing efficiency, and an example of such air diffuser has been disclosed by D. H. Houck and A. G. Boon in the "Survey and Evaluation of Fine Bubbles Dome Diffuser Aeration Equipment", (EPA-600/S2-81-222, October, 1981). The dome diffuser of Houck and Boon uses a maximum air diffusing pore diameter of 150 $\mu$m so as to achieve a high air diffusing efficiency. However, the dome diffuser has a shortcoming in that slime is apt to deposit on the surface thereof. More particularly, there exists a distribution of the air-pressure loss in the dome diffuser of the above-referred type, so the activated sludge in the tank deposits on the surface of the dome diffuser and also slime piled up by biological breeding occurs which accelerates the clogging of the diffusing pores with a low level of air diffusion therethrough. Because, the dome diffuser has an irregular distribution of the air-pressure loss due to the pore size distribution the finer pores, which have a larger air-pressure loss, will be hampered or blocked by activated sludge in the treated waste water. Furthermore, when the compressed-air is not transmitted into the dome diffuser, the activated slime deposits and piles at the surface to cause the holes to be plugged.

It is also known to mount a plurality of such porous air-diffuser plates on the top of a shallow box or to dispose a plurality of the porous of the porous plates on a box-type holder acting as an air supply duct as in the case of a planar air diffuser, so as to form an air diffuser for diffusing air through the thus disposed porous plates. In this case, non-uniform pressure loss in the porous plates is inevitable, so that the overall bubbling or foaming of the air diffuser becomes uneven. Even if the pressure loss of the individual porous plates are adjusted by orifices or the like, the overall pressure loss of the air diffuser fluctuates and uniform foaming cannot be expected in the air diffuser, so that the air diffusing efficiency is low and the slime is apt to deposit on the surface of the porous plates of this box-type air diffuser.

SUMMARY OF THE INVENTION

An object of the present invention is to obviate the above-mentioned shortcomings of the prior art by providing an improved air diffuser.

Another object of the invention is to provide an air diffuser capable of uniform generation of fine air bubbles at a high diffusing efficiency, thereby preventing deposition of slime on the surface of air diffusing non-porous plates and protects air diffusing pores thereof from clogging.

An embodiment of the air diffuser according to the present invention comprises a main body defining an air chamber therein, an orifice formed at one end of the main body and adapted to receive air into the air chamber therethrough, and a non-porous diffuser plate forming one sidewall of the main body and adapted to diffuse air from the inside to the outside of the main body, said diffuser plate having a smooth outer surface, more than 95% of pores of said diffuser plate having diameters within ±20% of a nominal diameter selected in a range of 50–300 $\mu$m.

The air diffuser of the present invention is particularly suitable for waste water treatment.

BRIEF DESCRIPTION OF THE DRAWINGS

For a better understanding of the invention, reference is made to the accompanying drawings, in which.

Throughout different views of the drawings, 1 is a diffusing member, 2 is an air chamber, 3 is a main body, 4 is an air diffuser plate, 4' is a packing, 5 is an orifice, 6 and 6' are air pipes, 6a is an air duct, 7 is a coupler, 8 is a non-porous thin sheet, 8' is a smooth thin sheet, and 9 is a diffusing pore.

DESCRIPTION OF THE PREFERRED EMBODIMENTS

Figure 1:
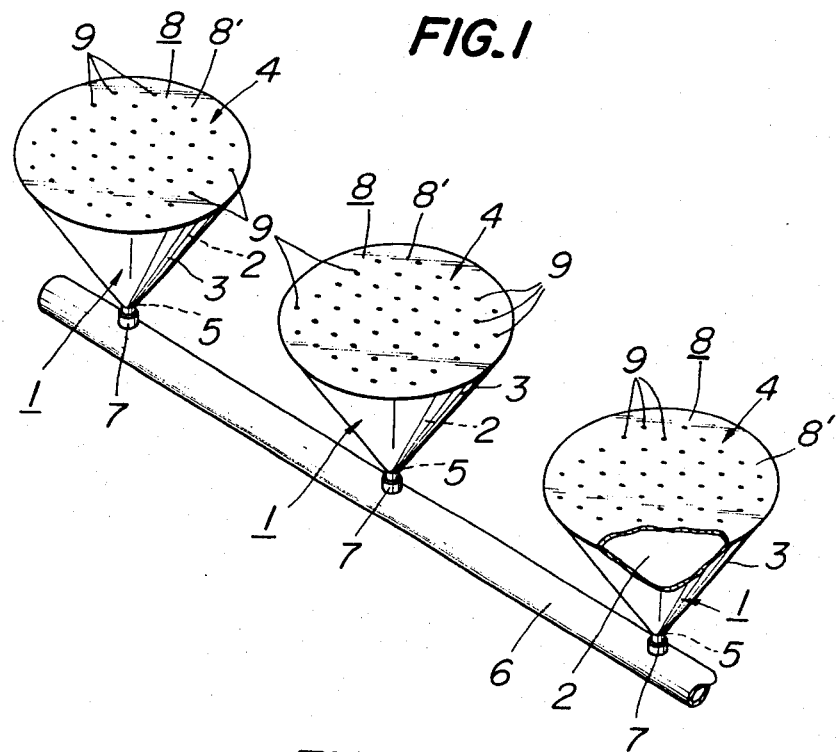
FIG. 1 is a partially cutaway perspective view of an air diffuser according to the present invention.
Figure 2:
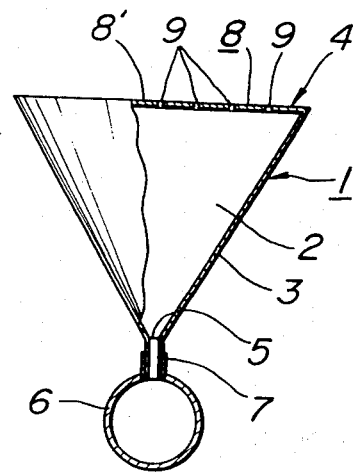
FIG. 2 is a partially cutaway side view of the air diffuser of FIG. 1.

Referring to a first embodiment, as shown in FIGS. 1 and 2, an air diffusing member 1 includes a hopper-shaped main body 3 having an air chamber 2 defined therein, a diffuser plate 4 secured to the top portion of the air chamber 2, and an orifice 5 formed at a contracted lower end portion of the main body 3. A plurality of couplers 7 are connectible to the orifices 5 of the individual main bodies 3, which are provided on an air pipe 6 at appropriate intervals, so that a plurality of the air diffusing members 1 are detachably mounted on the air pipe 6 by such couplers 7 at suitable intervals.

The diffuser plate 4 is made of a metallic, synthetic resin, or ceramic plate which has a smooth outer surface and a high resistivity against chemical corrosion. Preferably, the diffuser plate 4 is made of densified ceramics with an excellent corrosion resistivity, and more preferably it is a densified ceramic plate having glazed surfaces.

The surface smoothness of the diffuser plate 4 must be such that activated sludge cannot adhere to or stay on the diffuser plate. For instance, a maximum surface roughness, Rmax, of about 20 μm may be suitable for the diffuser 4 of the invention.

The diffuser 4 of the first embodiment is a non-porous thin sheet 8, which is made by artificially forming, with methods such as boring, a plurality of minute diffusing pores 9 of substantially the same diameter through a planer thin sheet 8' of several mm thickness with smooth surfaces. The pores 9 are preferably linear and must be distributed at substantially uniform intervals in an orderly fashion.

Figure 3:
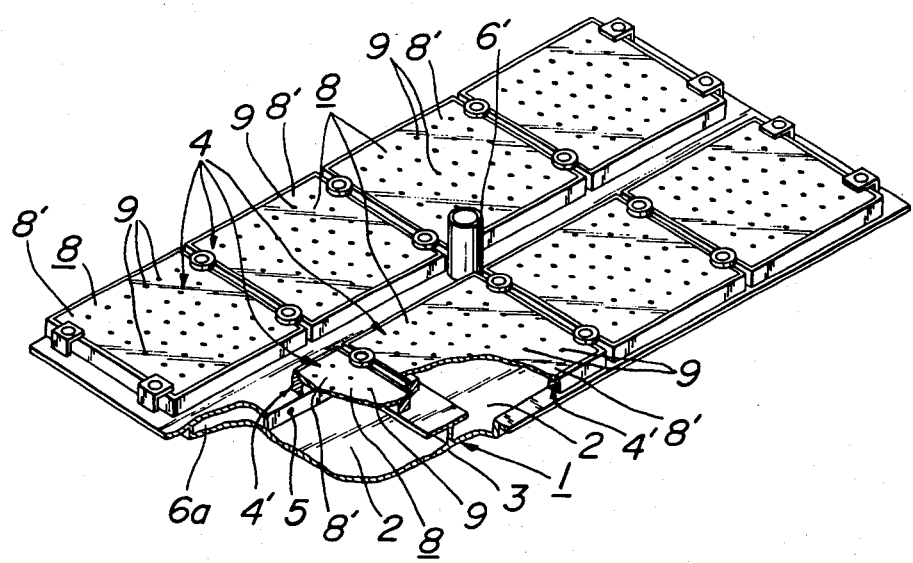
FIG. 3 is a partially cutaway perspective view of another air diffuser according to the present invention.
Figure 4:
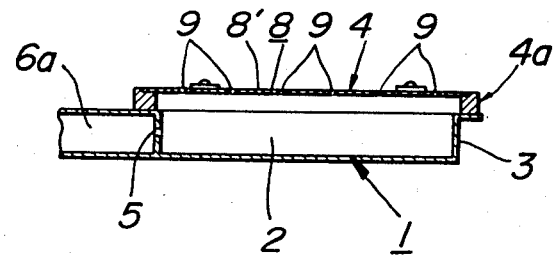
FIG. 4 is a sectional view of an essential portion of the air diffuser of FIG. 3.

In another a second embodiment of the invention, as shown in FIGS. 3 and 4, an air diffusing member 1 uses a main body 3 having a number of air chambers 2 defined therein, and diffusers 4 which are detachably mounted at the top portions of the individual air chambers 2. Each of the air chambers 2 has an orifice 5 connected to an air duct 6a communicating with an air supply pipe 6' at the central portion thereof. As compared with conventional air diffusers, the embodiment of FIGS. 3 and 4 is characterized in that the diffuser plate 4 is a non-porous thin sheet 8, which is made by boring a plurality of minute diffusing pores 9 of substantially the same diameters through a planer thin sheet 8' of several mm thickness with smooth surfaces. The pores 9 are preferably linear and must be distributed at substantially uniform intervals in an orderly fashion.

The plurality of diffusing pores 9 provided in the porous thin sheet 8 are for generating fine air bubbles, so that the diameter of the diffusing pores 9 must be small. The inventors have found that the diffusing pore diameter should be in a range of 50–300 μm, because if the diameter is smaller than 50 μm the diffusing pores 9 are apt to be plugged by dust particles or the like carried by the air flowing therethrough and suspended solid in the fluid in the aeration tank, while if the diameter is larger than 300 μm the air bubbles ejected by the diffusing pores 9 become too large and the net surface areas of the air bubbles is considerably reduced to lower the diffusing efficiency. More preferably, the diameter of the diffusing pores is in a range of about 100–200 μm and all the diffusing pores 9 have substantially the same diameter. If it is not economical to bore the diffusing pores 9 of the same diameter through a thin sheet 8 by drilling, punch pressing, laser beam boring, or the like, the conditions of substantially the same diameter can be met by limiting the diameters of at least 95% of the diffusing pores 9 in a range of ±20% of a nominal diameter selected in the range of 50–300 μm.

The cross-sectional shape of the diffusing pore 9 can be circular, elliptic, polygonal, or of any other suitable shape. In general, however, a circular cross-section for the diffusing pore 9 is preferable, from the standpoint of machining, formation of air bubbles, prevention of plugging, mechanical strength, and the like. As to the thickness of the smooth thin sheet 8, a thin sheet aids in the prevention of plugging, while a thick sheet yields higher mechanical strength, and the inventors have found that the thickness of 0.5–5 mm is preferable as a compromise for the smooth thin sheet 8 in the air diffuser of the present invention. In aeration of waste water treatment, the required amount of oxygen is determined by considering the amount of the waste water to be treated, the quality of the raw water in the water supply system concerned, the quality of the treated water, and the like. The number of air diffusing pores 9 can be selected from the required amount of oxygen thus determined while assuming a suitable diameter of the diffusing pore 9, the air-pressure loss, and the air flow rate per unit area per unit time. In reference to the relationship between the diameter of the diffusing pore 9 and the diameter of the bubble ejected by the diffusing pore 9, although the bubble size depends on various air diffusing conditions, such as the depth of water in the aeration tank, the diameter of the diffusing pore 9, the flow rate of air supplied, and pressure loss, the air bubble diameter is generally several times the diameter to several tens of times of the diameter of the diffusing pore 9. The air bubbles tend to combine together or gather with adjacent air bubbles in the vicinity of the diffusing pores, so as to reduce the net surface areas of the air bubbles. Accordingly, it is preferable to keep the spacing between the adjacent diffusing pores 9 larger than five times the diameter of the diffusing pore 9 in the non-porous thin sheet 8. In order to improve the air diffusing efficiency and to reduce the size of the air diffuser, almost the entire top surfaces of the air chambers 2 are preferably covered by diffusing pores 9 disposed substantially at uniform intervals. The diameter of all the diffusing pores 9 are substantially the same, so the difference of air-pressure loss in one non-porous thin sheet 8 is very small. However, when a plurality of non-porous thin sheets 8 are connected side by side for diffusing air, a finite difference in the level of the non-porous thin sheet 8 thus constructed is inevitable to cause inequality air bubbles. Therefore, in order to ensure uniform air bubbles, it is preferable to keep the air-pressure loss of the non-porous thin sheet 8 at more than 50 mmAq. When the pressure loss is larger than a certain value, increase of the air flow rate is small, but the power necessary for blowing the air is increased. Accordingly, the pressure loss of the non-porous thin sheet 8 should preferably be smaller than 300 mmAq. When the pressure loss is 50–300 mmAq, if the air flow per unit time per unit area is less than 0.05 l/min/cm$^2$, the amount of air flow per one air diffuser is small and a large number of air diffusers will be required for a given required amount of oxygen, resulting in a high cost of installation. On the other hand, if the air flow exceeds 0.50 l/min/cm$^2$, the diffusing efficiency is considerably reduced. Thus, it is preferable to select the air flow in a range of 0.05–0.5 l/min/cm$^2$.

In operation, the air diffuser of the above-mentioned construction is disposed in an aeration tank, as in the case of the conventional air diffuser, and the air is fed to the air chamber 2 of the diffuser through the air pipe 6 and the orifice 5 under the above-mentioned conditions so that the air passes against the pressure loss of the orifice 5 and the diffusing pores 9. When the air is forced into the aeration tank through the fine diffusing pores 9, which are of substantially the same diameter and are disposed at about uniform intervals over the entire surface of the non-porous thin sheet 8 mounted at the top of the air chamber 2, a large number of minute air bubbles with a mean diameter of about 1-5 mm are uniformly formed. In fact, such minute air bubbles are generated over the entire surface of the diffuser plate 4 at about a constant rate, so that the suspended solid in the aeration tank never deposits and piles at any portions of the surface of the diffuser plate 4. However, even when the air diffusion is temporarily interrupted due to faults such as power failure and blower failure, the activated sludge in the aeration tank may temporarily deposit on the surface of the diffuser plate 4, but upon recovery of the air supply at the air pipe 6, the activated sludge thus temporarily deposited on the surface of the diffuser plate 4 is dispersed from the diffuser plate 4 and suspended again, because at least the outer surface of the diffuser plate 4 is smooth and the diffusing pores 9 are linear. Thus, the risk of plugging the diffusing pores, which has been experienced with the conventional air diffusers with bent diffusing pores through non-porous diffuser plate, is now almost completely eliminated, and the air diffusing efficiency is considerably improved.

As described in detail in the foregoing by referring to the preferred embodiments, an air diffuser of the present invention uses a diffuser plate mounted at the top portion of an air chamber, which diffuser plate has at least an outer surface thereof made smooth and a number of fine diffusing pores with substantially the same diameters bored therethrough at uniform intervals, so that a large number of minute air bubbles with substantially the same diameters can be produced uniformly from the diffusing pores, and the diffusing pores are free from clogging even after a long period of continuous service. Whereby, increase of pressure loss of the diffuser plate is prevented, so that the air diffusing efficiency is greatly improved and the air blowing power is reduced while enabling the reduction of the size of the air diffuser. Thus, the invention contributes greatly to the industry.

Although the invention has been described with a certain degree of particularity, it is to be understood that the present disclosure has been made only by way of example and that numerous changes in details of construction and the combination and arrangement of parts may be resorted to and may be otherwise embodied within the scope of the following claims.

What is claimed is:

1. An air diffuser for waste water treatment, comprising:
   a main body defining an air chamber therein, the main body having a first end and a second end, said first end is adapted to receive air into the air chamber therethrough, and said second end has a non-porous material comprising a rigid diffuser plate, attached thereto, said rigid diffuser plate having a plurality of artificially formed pores therethrough for diffusing air from said air chamber through said pores into a waste water solution, said diffuser plate having a smooth outer surface and at least 95% of said plurality of pores having diameters which are within ±20% of a nominal diameter selected from a range between 50 $\mu$m and 300 $\mu$m.

2. The air diffuser of claim 1, wherein the nominal diameter of the pores of the non-porous rigid diffuser plate is selected from a range between 100-200 $\mu$m.

3. The air diffuser of claim 1, wherein adjacent pores through the non-porous rigid diffuser plate are spaced apart by more than five times the nominal diameter of the pores.

4. The air diffuser of claim 1, wherein said non-porous diffuser plate has a thickness selected from a range between 0.5-5 mm.

5. The air diffuser of claim 1, wherein said pores through the non-porous rigid diffuser plate are linear.

6. The air diffuser of claim 1, wherein said densified ceramics comprising the non-porous diffuser plate are glazed.

7. The air diffuser of claim 1, wherein said main body is funnel shaped and said first end of said main body is smaller in diameter than said second end of said main body.

8. The air diffuser of claim 1, wherein said main body is box-like in shape and said first end of said main body corresponds to a side wall of said box-like main body and said second end of said main body corresponds to a top portion of said box-like main body.

9. The air diffuser of claim 1, wherein said first end of said main body is communicated with an air passage.

10. The air diffuser of claim 9, wherein a plurality of main bodies are communicated with said air passage.

11. The air diffuser of claim 1, wherein said non-porous material comprising the rigid diffuser plate is selected from a group consisting of metals, synthetic resins and ceramics.

* * * * *